United States Patent [19]

Ostermeier

[11] Patent Number: 4,634,248
[45] Date of Patent: Jan. 6, 1987

[54] PHOTOGRAPHIC CAMERA FOR PRODUCING A COMPOSITE PICTURE

[75] Inventor: Heinrich Ostermeier, Cologne, Fed. Rep. of Germany

[73] Assignee: Happycard International Limited, Shannon, Ireland

[21] Appl. No.: 777,745

[22] Filed: Sep. 19, 1985

[30] Foreign Application Priority Data

Sep. 21, 1984 [DE] Fed. Rep. of Germany ....... 3434634

[51] Int. Cl.$^4$ ..................... G03B 15/08; G03B 27/72
[52] U.S. Cl. ..................... 354/75; 354/108; 354/110; 355/40; 355/71; 362/16; 352/47
[58] Field of Search ............... 354/76, 77, 105, 106, 354/107, 108, 109, 110, 126; 355/70, 71, 40, 43, 67; 352/47, 89; 362/16

[56] References Cited

U.S. PATENT DOCUMENTS

| | | | |
|---|---|---|---|
| 3,331,298 | 7/1967 | Wiggins | 354/120 |
| 4,011,570 | 3/1977 | Stievenart et al. | 354/109 |
| 4,018,519 | 4/1977 | Clapp | 354/89 |
| 4,533,224 | 8/1985 | Ou | 354/77 |

FOREIGN PATENT DOCUMENTS 3127291 5/1983 Fed. Rep. of Germany .

Primary Examiner—A. A. Mathews
Attorney, Agent, or Firm—Birch, Stewart, Kolasch & Birch

[57] ABSTRACT

A photographic camera for producing a composite picture comprises a casing including means for focussing an image of an external object or scene on a first portion of an unexposed photographic medium disposed in an image plane within the casing and a plurality of projection systems for focussing respective static thematic images, illuminated by a flash tube within the casing, on other respective portions of the medium. The flash tube is located within a portion of the casing which is separated from the thematic images by a light-diffusing plate, the light-diffusing plate being located close to the thematic images for illumination thereof. The projection systems have different aperture sizes each related to the distance of the flash tube from the portion of the plate adjacent the thematic image which is focussed on the medium by the respective projection system, whereby uneven illumination of the different thematic images by the flash tube is at least partially compensated at the image plane.

25 Claims, 3 Drawing Figures

PHOTOGRAPHIC CAMERA FOR PRODUCING A COMPOSITE PICTURE

BACKGROUND OF THE INVENTION

The invention relates to a photographic camera for producing a composite picture, the camera comprising a casing including means for focussing an image of an external object or scene on a first portion of an unexposed photographic medium disposed in an image plane within the casing and a plurality of projection systems for focussing respective static thematic images, illuminated by a flash tube within the casing, on other respective portions of the medium.

DESCRIPTION OF RELATED ART

A photographic camera of the above kind is described in German Patent Specification No. 31 27 291 Cl. In the casing of the camera, provision is made for a number of separate light paths directed at different areas of the image plane. These paths are provided with suitable slide holders and projection devices for the reproduction of thematic transparencies as well as with a direct photographic system for the reproduction of a externally-derived image proper.

A photographic camera is also known from German Patent Specification OS No. 25 54 048 which produces a photograph of a person together with relevant personal data. A flash tube is provided for illuminating the data carrier which is projected by an optical system on to the film plane.

SUMMARY OF THE INVENTION

The object of the present invention is the provision of a photographic camera of the aforementioned kind which is so designed that more than one projection system for thematic images can be satisfactorily illuminated by a single flash tube. A further object is to achieve a photographic camera of simple and serviceable overall construction despite the plurality of its optical projection systems.

This object is achieved according to the invention by the improvement wherein the flash tube is located within a portion of the casing which is separated from the thematic images by a light-diffusing plate. The light-diffusing plate is located close to the thematic images for illumination thereof, and wherein the projection systems have different aperture sizes each related to the distance of the flash tube from the portion of the plate adjacent to the thematic image which is focused on the medium by the respective projection system, whereby uneven illumination of the different thematic images by the flash tube is at least partially compensated at the image plane.

In this way satisfactory lighting of a number of thematic images can be achieved with a single flash tube, for example an electronic flash.

The light-diffusing plate may be a ground glass plate or a grating. The invention is principally applicable to thematic images in the form of transparencies, but it can also be used for non-transparent thematic images.

It is preferable to place an optically-opaque intercepting screen between the flash tube and the light-diffusing plate so that the latter is illuminated exclusively by indirect, reflected light. This measure is also effective in achieving a more uniform lighting of the different areas of the light-diffusing plate.

It is also preferable for the intercepting screen to be tongue-shaped and to act as a reflector, of polished metal for example, on the side facing the flash tube. This ensures that the light emitted by the flash tube is efficiently used for lighting the surface of the ground glass or other light-diffusing plate. The portion of the casing containing the flash tube may conveniently itself have a light-scattering internal surface or be fitted with an insert of similar type. Such a surface may be provided by lining with white unwoven material, white felt or other known light-scattering material.

As a further development of the invention, it may be beneficial to mount the flash tube unsymmetrically and preferably to one side of the portion of the camera casing concerned.

The flash tube is conveniently mounted in a lamp holder whose light-emitting aperture is screened by a ground glass plate which is shielded from the aforementioned light-diffusing plate by the intercepting screen mentioned above. The angle made by the ground glass plate at the aperture of the lamp holder and the flat-surfaced intercepting screen is preferably less than 70° and may conveniently be 60°.

It is also preferable to blacken at least a part of the light-scattering internal surface of the casing close to the flash tube and to shape the blackened part in such a way as to provide an additional safeguard against excessive illumination of the area of the light-diffusing plate close to the flash.

The photographic camera may conveniently be constructed in such a way that the optical axes of the projection systems for the thematic images pass vertically through the casing while a horizontal slide-in transparency holder capable of accommodating a number of thematic transparencies is located immediately below an upper portion of the casing housing the flash tube and light-diffusing plate. The lenses of the projection systems are located in a horizontal partition underneath the light-diffusing plate, while the lens for photographing the external image proper is located in a horizontal portion of a right-angled light compartment, the lens having a horizontal optical axis which is deflected by a mirror into a vertical portion of the compartment so that the external image proper is focused on the image plane of the projected thematic transparencies. A lower portion of the casing contains a device which stores the photographic medium to be exposed.

This arrangement results in compact construction and optimum camera manipulation due to the favourable weight distribution.

The device for storing the photographic medium to be exposed may conveniently take the form of the familiar spool or, more preferably, a stack of unexposed film.

The photographic camera may conveniently be constructed in such a way that the casing contains a viewfinder and viewfinder tube so arranged that the viewfinder tube is located in the free space between the light ray paths of the projection systems. The viewfinder may conveniently be fitted with an interchangeable diaphragm compatible with the crosssection of the vertical portion of the light compartment enclosing the light ray path of the external image proper.

The characteristics of the invention result in a photographic camera which is simple in overall construction and convenient to manipulate and in which a single flash tube suffices for the satisfactory projection of a number of thematic image transparencies.

Further scope of applicability of the present invention will become apparent from the detailed description given hereinafter. However, it should be understood that the detailed description and specific examples, while indicating preferred embodiments of invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENT

Figure 1:
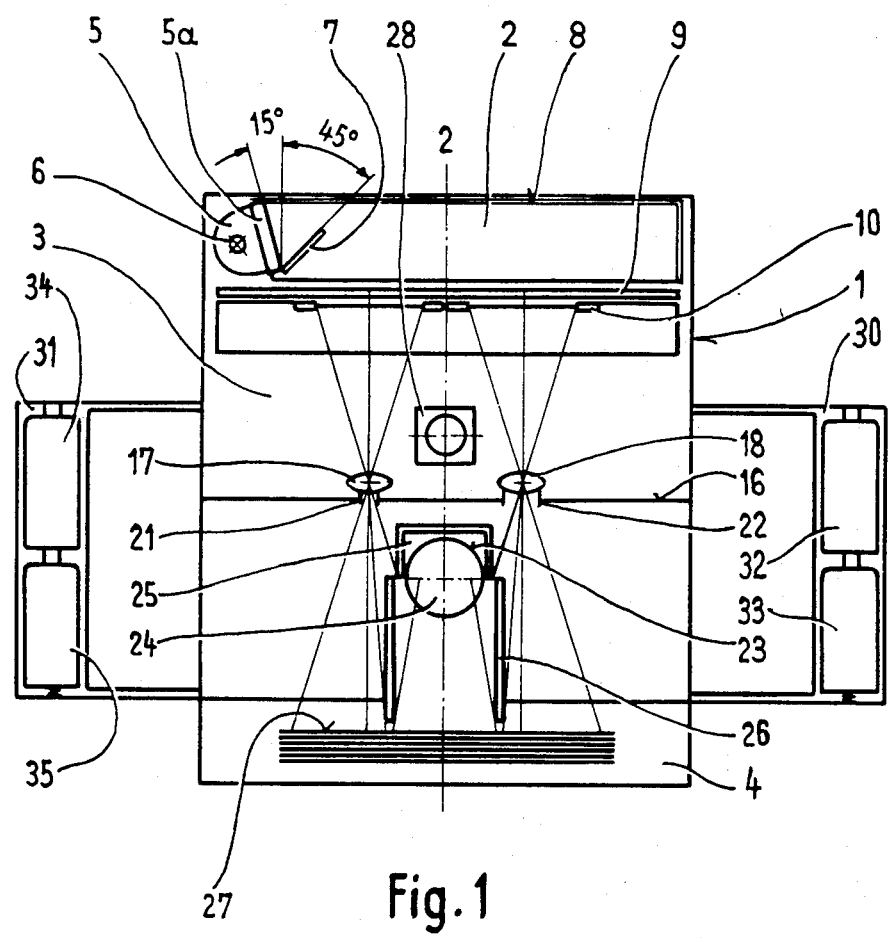
FIG. 1 is a longitudinal cross section through the photographic camera of the present invention.
Figure 2:
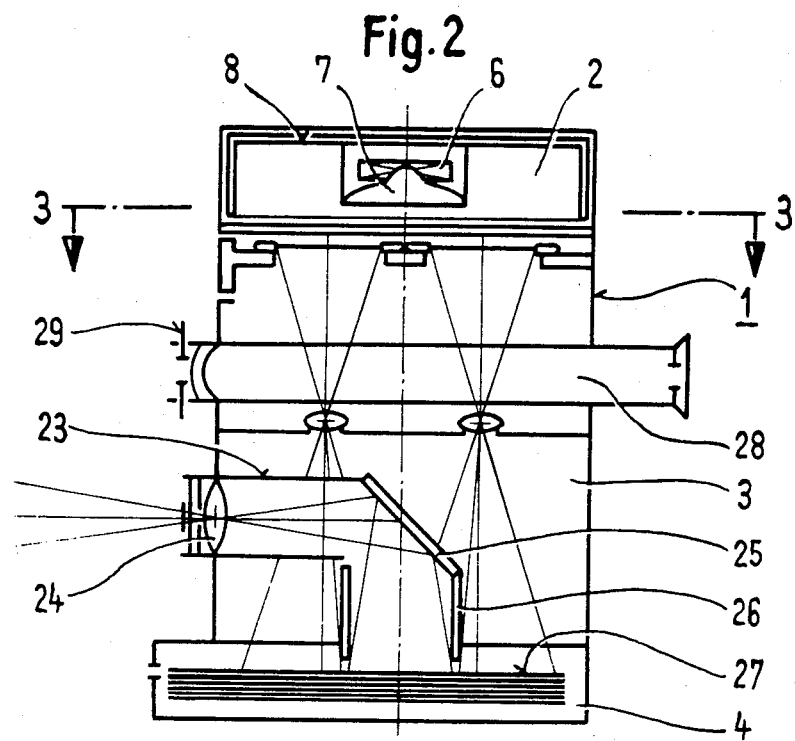
FIG. 2 is a cross section along the line 2—2 in FIG. 1.

FIGS. 1 and 2 show a casing 1 divided into an upper portion 2, a middle portion 3 and a lower portion 4.

The upper portion 2 of the casing contains a lamp holder 5 with a flash tube 6 which emits light through a ground glass plate 5a fitted in the aperture of the lamp holder 5. In front of the light-emitting aperture of the holder 5 is located a tongue-shaped intercepting screen 7 which is designed as a polished metal reflector on the side facing the plate 5a. The upper internal surface of the casing portion 2 contains an insert 8 made of white unwoven fabric to scatter the light. The plane of the light-emitting aperture of the lamp holder 5 is inclined at 15° from the vertical while the tongue-shaped intercepting screen 7 is inclined at 45° to the vertical in the opposite direction.

Figure 3:
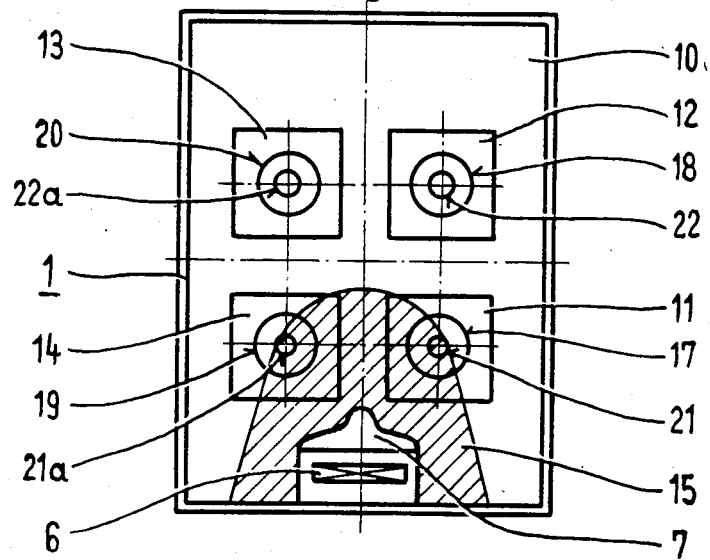
FIG. 3 is a cross section along the line 3—3 in FIG. 2 and a plan view of the slide holder.

Below the upper portion 2 of the casing 1 is situated a ground glass plate 9 located immediately above a transparency holder 10 which slides horizontally into a corresponding slot in the casing 1. The purpose of the above-mentioned screen 7 is to shield the ground glass plate 9 from the flash tube 6 whereby the plate 9 is exclusively illuminated by indirect light. As can be seen in FIG. 3, the transparency holder 10 is provided with four recesses 11, 12, 13 and 14 to accommodate suitable thematic transparencies.

To suit the color temperature of the flash tube 6, the ground glass plates 5a and/or 9 may conveniently be made to act as color filters. Alternatively, gratings with color filter properties may be used for this purpose.

In the area close to the light-emitting aperture of the lamp holder 5, the light-scattering insert 8 is provided with a tongue-shaped blackened area 15, the outline of which is shown in FIG. 3.

The middle portion 3 of the casing contains a horizontal partition 16 spaced from the holder 10 in which are located four projection systems 17, 18, 19 and 20 in the form of aspherical doublets. This partition 16 may be made interchangeable for the purpose of changing the projection systems. The optical axes of the projections of the ground glass plate 9 which are closest to the flash tube.

The lower portion 4 of the casing contains unexposed photographic material in the form of a conventional multiple pack of film. However, other forms of photographic film feed devices may be used, for example film spools. In all cases the unexposed film, or in the case of the multiple pack shown, the uppermost film of the stack, is located in the image plane 27 of the projection systems 17 to 20.

The differing aperture sizes (diaphragm diameters) of the projection systems 17 to 20 are each related to the distance of the flash tube 6 from the portion of the plate 9 adjacent to the thematic image which is focused on the image plane by the respective projection system, whereby uneven illumination of the different thematic images by the flash tube is at least partially compensated at the image plane 27.

For focusing the external image on the image plane 27, the camera is provided with a right-angled light compartment having a horizontal portion 23 fitted with a lens 24 with adjustable diaphragm and shutter, the optical axis of the lens 24 being horizontal. At the rear end of the horizontal portion 23 a 90° deflecting mirror 25 directs the light rays into a vertical portion 26 the bottom edge of which effects a sharp-edged delimitation of the external image and can take various cross-sectional shapes, e.g. tubular, angular, heart-shape, elliptical, lozenge-shape and so on. This vertical portion 26 of the light compartment extends down to the surface of the image plane 27 located in the lower portion 4 of the casing and either touches the photographic medium or terminates a short distance from it.

The middle portion 3 of the casing also contains a viewfinder with a horizontal viewfinder tube 28 located in a free space which does not intercept the light from the projection systems 17 to 20. The viewfinder is provided with an interchangeable diaphragm 29 enabling it to be adapted to the various cross-sectional shapes of the tubular vertical light compartment 26. The cross-sectional shape of the vertical light compartment determines the outline of the image proper.

Battery compartments 32, 33, 34 and 35 are housed in two handles 30 and 31 of the camera casing 1.

The other camera components, including the wiring of the flash tube 6, are of conventional design and have therefore been omitted in the schematic drawing. The switching elements used to actuate the flash may conveniently by synchronized, where appropriate, with the shutter release of the lens used to photograph the external image proper.

A photographic camera of this kind is especially useful for the production of picture postcards. In this context, various static thematic images such as characteristic views can be combined with a portion devoted to shots of people.

I claim:

1. In a photographic camera for producing a composite picture, the camera comprising a casing including means for focusing an image of an external object or scene on a first portion of an unexposed photographic medium disposed in an image plane within the casing and a plurality of projection systems for focusing respective static thematic images, illuminated by a flash plate, the light-diffusing plate being located close to the thematic images for illumination thereof, and wherein the projection systems have different aperture sizes each related to the distance of the flash tube from the portion of the plate adjacent to the thematic image which is focused on the medium by the respective projection system, whereby uneven illumination of the different thematic images by the flash tube is at least partially compensated at the image plane.

2. A photographic camera according to claim 1, further including a screen to shield the light-diffusing plate from the flash tube whereby the plate is exclusively illuminated by indirect light.

3. A photographic camera according to claim 2, in which the flash tube is located in a lamp holder and a light-emitting aperture of the lamp holder is fitted with a light-diffusing plate.

4. A photographic camera according to claim 1, in which the light-diffusing plate is a ground glass plate.

5. A photographic camera according to claim 1, in which the light-diffusing plate is a grating with color filter properties.

6. A photographic camera according to claim 2, in which the screen is tongue-shaped and reflective on the side facing the flash tube.

7. A photographic camera according to claim 1, in which the internal surface of the portion of the casing containing the flash tube has light-scattering properties.

8. A photographic camera according to claim 7, in which a part of the said internal surface is blackened in an area close to the flash tube.

9. A photographic camera according to claim 1, in which the flash tube is located asymmetrically to one side of the said portion of the casing.

10. A photographic camera according to claim 1, in which the thematic images are transparencies, the camera includes a transparency holder into which the transparencies are fitted and which removably slides into the casing adjacent to the light-diffusing plate, the projection systems comprise respective lens means disposed in a partition of the casing substantially parallel to and spaced from the transparency holder, the optical axes of the projection systems being substantially perpendicular to the transparency holder, and the means for focussing an image of an external object or scene on the unexposed photographic medium comprises a further lens means having an optical axis substantially perpendicular to the optical axes of the projection systems, a mirror for deflecting light from the further lens means through 90 degrees onto the image plane, and right-angled compartment means internally of the casing through which the light from the further lens means passes to the image plane.

11. A photographic camera according to claim 10, in which the casing contains a viewfinder tube arranged to pass through a part of the casing which does not intercept light from the projection systems.

12. A photographic camera according to claim 11, in which the viewfinder has an interchangeable aperture compatible with the cross-sectional shape of the portion of the right-angled compartment adjacent to the image plane.

13. A photographic camera for producing a composite picture comprising:
a casing;
focusing means for focusing an image of an external object or scene on a first portion of unexposed photographic medium disposed within an image plane within said casing;
a plurality of thematic images;
a plurality of projecting means for focusing respective thematic images on other respective portions of the unexposed photographic medium;
a light-diffusing plate separating said casing into a first portion and a second portion; and
a flash tube located within said first portion of said casing, said plurality of thematic images are positioned adjacent said light-diffusing plate and positioned within said second portion of said casing;
said plurality of projection means have different aperture sizes each related to the distance between said flash tube and a portion of said light-diffusing plate adjacent respective thematic images for substantially evenly exposing respective thematic images upon the photographic medium positioned at the image plane.

14. The photographic camera according to claim 13, further including a screen located between said flash tube and said light-diffusing plate to shield said light-diffusing plate from said flash tube whereby the plate is exclusively illuminated by indirect light.

15. The photographic camera according to claim 13, further including a lamp holder having a light-emitting aperture fitted with a light-diffusing plate, said flash tube is disposed within said lamp holder.

16. The photographic camera according to claim 14, further including a lamp holder having a light-emitting aperture fitted with a light-diffusing plate, said flash tube is disposed within said lamp holder.

17. The photographic camera according to claim 13, wherein said light-diffusing plate is a ground glass plate.

18. The photographic camera according to claim 16, wherein said light-diffusing plate is a ground glass plate.

19. The photographic camera according to claim 13, wherein said light-diffusing plate is a grating with color filter properties.

20. The photographic camera according to claim 16, wherein said light-diffusing plate is a grating with color filter properties.

21. The photographic camera according to claim 13, further including a light-scattering insert provided with a substantially planar tongue-shaped blacken area positioned within said first portion of said casing above and substantially parallel with respect to said light-diffusing plate.

22. The photographic camera according to claim 16, further including a light-scattering insert provided with a substantially planar tongue-shaped blacken area positioned within said first portion of said casing above and substantially parallel with respect to said light-diffusing plate.

23. The photographic camera according to claim 13, including a tongue-shaped intercepting screen positioned between said flash tube and said light-diffusing screen.

24. The photographic camera according to claim 22, including a tongue-shaped intercepting screen positioned between said flash tube and said light-diffusing screen.

25. The photographic camera according to claim 23 wherein said tongue-shaped intercepting screen is a polished metal reflector.

* * * * *